United States Patent Office 2,907,660
Patented Oct. 6, 1959

2,907,660

PORK RIND COOKING PROCESS

Edward D. O'Brian, Anaheim, Calif., and Robert E. O'Brian, Des Moines, Iowa

No Drawing. Application May 15, 1958
Serial No. 735,391

1 Claim. (Cl. 99—107)

This invention relates to a new and improved process for producing an intermediary product from pork rinds which is capable of being heated so as to form a puffed, edible food product.

Puffed pork rinds are widely sold at the present time. Traditionally such pork rinds have been prepared by first rendering rinds as they are obtained from various meat processing operations in an open kettle until such time as substantially all of the grease is rendered from such rinds. The so-rendered rinds are allowed to cool and dry in air so as to form a comparatively hard, brittle intermediary product having essentially a leathery appearance. Such an intermediary product is conventionally puffed by immersing it in hot grease at above 200° C. The final product from such cooking is roughly analogous to common potato chips and certain puffed cereal products.

This conventional type of processing for pork rinds inherently has a number of disadvantages. There is considerably variation in pork rinds as they are obtained from meat processors. Such variation makes it extremely difficult, if not impossible, to satisfactorily control the initial rendering operation so as to produce a completely uniform intermediary product. Frequently the intermediary product produced contains a number of rinds having essentially a burned appearance and contains a number of rinds which do not harden in the air to the usual appearance of the intermediary product. These two types of undesired intermediary products correspond to overcooked and undercooked, or rendered rinds, respectively. They present a considerable problem in that either they must be sorted out or the final puffed product will not have the uniform quality desired for commercial reasons.

In order to improve the uniformity of puffed pork rinds a number of processes have been proposed. It it well known that many plants carry out the initial rendering operation under rather close temprature conditions using steam jacketed vessels, or the like. Also a number of persons have developed processes in which pork rinds as obtained from a meat processor are treated in steam pressure vessels. In general it may be stated that improvements of the generally broad type indicated in this paragraph are not completely satisfactory. Close control of the temperature used in an open rendering vessel does not make it possible to provide a uniform product from pork rinds of varying thickness and consistency. The use of steam cooking in processing pork rinds is disadvantageous because of the fact that pork rinds themselves tend to react with water under pressure so as to form a gelatin-like intermediary product which cannot be satisfactorily handled and puffed for all purposes.

A broad object of the present invention is to provide a new process for preparing pork rinds so as to form an intermediary product capable of being heated in order to form a puffed, edible food product. Another object of this invention is to provide a process of this type which can be satisfactorily carried out with pork rinds of varying consistency and thickness so as to produce a uniform product. A further object of this invention is to provide a process of this same type which produces an intermediary product capable of being formed into a puffed edible food product having less moisture sensitivity than prior similar products. A related object of the invention is to provide a process of the same variety which results in a final puffed edible product having a higher weight per unit of weight of initial pork rinds than prior related processes. These and other objects of this invention will be apparent to those familiar with the field to which it pertains from a careful study of the remainder of this description including the appended claim.

As an aid to understanding the invention it can be stated in essentially summary form that it involves a process in which pork rinds are heated under pressure in the absence of "free" water or water vapor under a vapor derived from these rinds themselves. Obviously in carrying out the process other steps of a secondary nature are employed in creating a final intermediary product.

The term "pork rind" used herein is used in a broad general sense. Commercially the puffed, edible food product sold as "fried pork rinds" normally is processed bacon rinds. Although it is possible to carry out the process of this invention with so-called "green skins" or "green rinds" which are obtained from meat processing operations without having been subjected to conventional salt cures and the like, it is normally preferred to carry out the process of this invention with bacon rinds or pork rinds which have been treated by conventional curing and smoking operations.

Such rinds or skins as obtained from meat processing operations normally vary a great deal in thickness, and in consistency. Frequently they will carry small scraps of bacon or the like. Any obvious meat scraps carried with such rinds should be removed from them prior to treatment in accordance with this invention, although this is not mandatory.

The process treatment conditions carried out in accordance with this invention should be varied slightly depending upon the nature of the rinds being treated and the size of the pieces of these rinds. Preferably pieces of rinds of substantially the same size are treated simultaneously. In general, rinds containing a relatively high percentage of inorganic salts from curing operations contain more water which can be removed by simple heating than other rinds and, hence, require more initial heating to remove such water than other rinds. The actual pressure treatment under a vapor derived from such rinds with the present invention does not, however, vary to any substantial degree with the amount of water initially present in such rinds.

In carrying out the process of this invention rinds as obtained from meat processing may, of course, be cut to any desired size or shape. Preferably these rinds are then heated so as to exhaust from them all "free" or chemically uncombined water which can be removed directly by conventional heating. It is preferred to carry out this operation in the same apparatus used in heating the rinds under pressure.

This apparatus is normally first charged with a mixture of the rinds and an amount of grease equal to from about 20% to about 45% by weight of the rinds themselves. Common grease obtained from conventional rendering operation is satifactory. This initial grease is considered necessary in order to prevent undesired reactions between adjacent pieces of rinds during the subsequent treatment. If too much grease is utilized, the individual rinds tend to adhere to one another as they are ultimately obtained from the pressure treating vessel.

If too little grease is used, the individual pieces of rinds tend to render into a sticky mass in the same vessel. The use of less grease than indicated will provide a product which is usable commercially, however, in general, the larger the pieces of rinds used, the more grease should be admixed with these rinds.

After a vessel has been charged with a mixture as indicated this vessel is, in carrying out the invention, heated to a temperature slightly in excess of 100° C., preferably in the range of from 100° C. to 103° C., until such time as all normally visible vapor from the rinds themselves is removed from these rinds. Such visible vapor is considered to consist almost entirely of water held within the rinds as initially obtained in essentially a free type of state so that it can be removed from the rinds by simple heating. Such removal of water in the form of water vapor prevents it (the water) from remaining within the treating vessel so as to react with the rinds and with the various materials of a chemical nature within these rinds during the next operation. Thus, the next operation is carried out under essentially dry, or water-free conditions. It is believed that substantially no chemical reactions take place during this initial drying stage.

After all of the visible vapor is removed from the vessel indicated, this vessel is next closed so that it is filled with the material charged into it and with an atmosphere of invisible vapor produced from the rinds. It is then further heated so that the pressure and temperature developed within the vessel are sufficient to render the rinds within it. During such rendering, grease is, of course, caused to be removed from these rinds. During this removal of grease the specific gravity of the rinds changes.

It is preferred to carry out such further heating under pressure until the point is reached where the specific gravity of the grease within the vessel and to a point immediately before the rinds themselves will start to puff within this pressure vessel. This critical point may easily be determined for any specific type of rind and for rinds of any specific size by a minimum amount of experimentation. Although it is indicated here that the specific gravity of the rinds is less than the specific gravity of the grease within the vessel at the point where this heating under pressure should be stopped, as a practical matter satisfactory results are obtained when the specific gravity of the rinds is approximately equal to the specific gravity of this grease. Because of the nature of the material being treated, it is difficult to determine when the specific gravity of the rinds is exactly less than the specific gravity of the grease.

The reactions which take place during this pressure cooking or heating are apparently proportional to both time and pressure of the heating in an inverse type of relationship. Thus, the lower the pressure used, the longer the time required, or conversely, the higher the pressure used, the shorter the time required. Satisfactory results can be uniformly obtained using pressures up to 20 p.s.i. gauge. Commercially satisfactory results can be achieved also by using pressure as low as 5 p.s.i. gauge. The times required for such pressure treatments are best determined as indicated in the preceding paragraph with a nominal amount of experimentation since they will vary somewhat depending upon the specific rinds being treated. Times of from about 15 minutes to about 1 hour are in general satisfactory. With commercial, cured bacon rinds satisfactory results have been achieved commercially using a pressure of 15 p.s.i. gauge and a treatment time of 25 minutes.

At the close of the treatment wherein the rinds are heated under pressure, the rinds themselves are removed from the vessel employed and allowed to cool or dry under normal atmospheric conditions so as to obtain the desired intermediate product. This intermediate product does not pick up moisture vapor from the air to any material extent and has essentially a dry, leathery appearance and is brittle in character.

Although this intermediate product appears as the prior intermediate product utilized in preparing puffed pork rinds, it differs in several respects. Puffed pork rinds formed from it by immersing in hot grease are substantially moisture insensitive in character while prior similarily puffed pork rinds tend to deteriorate and become limp in character when exposed to a wet or humid atmosphere. The final product of this invention tends to retain a crisp character under the similar conditions. Thus, is can be satisfactorily sold in sacks which are not completely moisture proof.

Puffed pork rinds prepared in accordance with this invention are economically advantageous when compared with prior related products such as are produced by conventional open tank rendering process. When the intermediate product of the present invention is prepared into puffed pork rinds by immersing it in hot grease it has been discovered that the final puffed product obtained per unit of weight of raw pork skins is about 10%–15% heavier than the final puffed product obtained per unit of weight of raw skins using open tank rendering techniques and puffing in hot grease as indicated in the initial part of this specification. This weight gain is very important commercially. The product itself obtained using the intermediate product of this invention does not noticeably contain more grease than any other similar product.

As an aid to understanding the invention, the following specific examples of it are given.

*Example I*

Cured bacon rinds were cut into squares ½ inch along each side and were placed in a pressure vessel along with bacon grease in the amount of 20% by weight of the rinds. The vessel with a vent cock open was heated by a direct gas flame until visible vapor ceased to flow from it. During this time the material in the vessel reached a temperature of about 101° C.; this initial heating occupied a period of about five minutes. At the end of this period the vent cock was closed and heat was applied to the vessel as by a gas flame so as to bring the pressure in the vessel up to about 5 p.s.i. gauge. During this heating under pressure, the material in the vessel was covered by an atmosphere of vapor derived from the rinds. After about thirty minutes treatment at the above pressure the heat was turned off and the vessel opened. The intermediate product was then allowed to cool and dry in perforated baskets outside the vessel.

*Example II*

The same steps indicated in Example I were followed using strips of cured bacon rinds ½ inch wide and the length of the rinds. These were admixed with about 30% by weight of bacon grease. During the pressure treatment these rinds were heated for a period of twenty-five minutes so that a pressure of 15 p.s.i. gauge was developed within the pressure vessel.

*Example III*

The same steps indicated in Example I were followed using whole cured bacon rinds. These were admixed with bacon grease in the amount of 45% by weight of the rinds. During the pressure treatment the rinds were heated for approximately one hour at a pressure of 20 p.s.i. gauge.

This application is a continuation-in-part application of co-pending application, Serial No. 498,769, filed April 1, 1955, entitled Pork Rind Cooking Process, now abandoned.

We claim:

A process for forming an intermediary product from pork rinds capable of being heated so as to enlarge in volume to form a puffed, edible food product, which process comprises: admixing said rinds with an amount of grease equal by weight from about 20%–45% by weight of said rinds; heating said rinds at a temperature of from about 100°–103° C. until all visible vapor is removed from said rinds; and further heating said rinds and said grease under an invisible vapor produced from said rinds at a pressure of from about 5 p.s.i. gauge to about 20 p.s.i. gauge for a period of from about 15 minutes to about one hour until the specific gravity of said rinds becomes approximately equal to the specific gravity of said grease without said rinds puffing; and removing said rinds from said grease and cooling said rinds.

References Cited in the file of this patent

UNITED STATES PATENTS

| | | |
|---|---|---|
| 2,179,616 | Darrow | Nov. 14, 1939 |
| 2,547,747 | Darrow | Apr. 3, 1951 |
| 2,562,850 | Winslow | July 31, 1951 |

OTHER REFERENCES

"Food Industries," April 1948, pp. 108 and 109, article entitled Fried Bacon Rind Strips Win Acceptance In South.